W. I. PATTERSON.
OUTLET BOX FOR ELECTRIC CONDUCTORS.
APPLICATION FILED APR. 28, 1914.
1,236,754.
Patented Aug. 14, 1917.
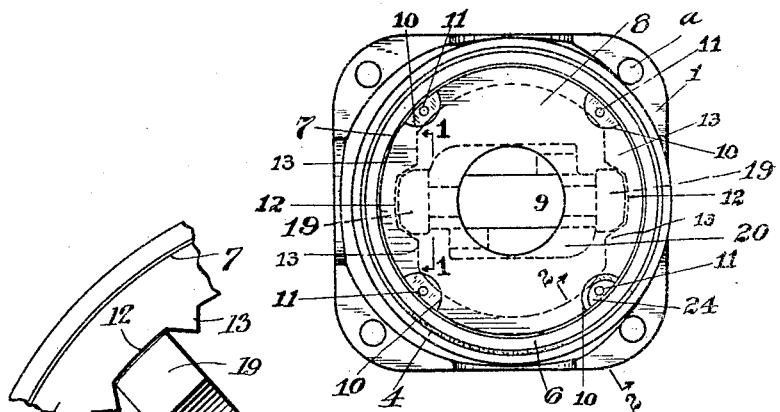
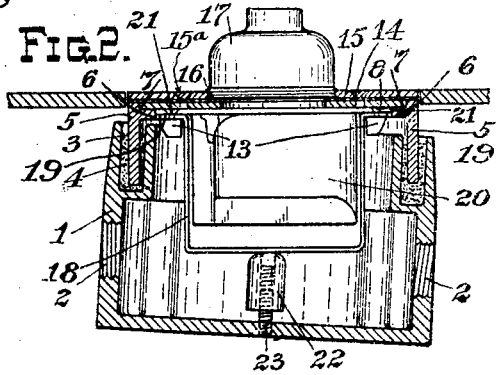
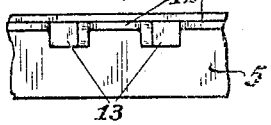
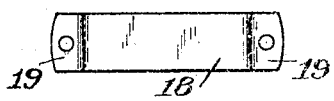
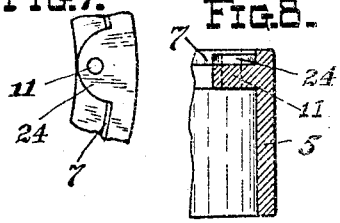
WITNESSES
W. A. Härtle
C. A. Williams
INVENTOR
William I. Patterson
by John H. Roney
ATTORNEYS

UNITED STATES PATENT OFFICE.

WILLIAM I. PATTERSON, OF PITTSBURGH, PENNSYLVANIA.

OUTLET-BOX FOR ELECTRIC CONDUCTORS.

1,236,754.   Specification of Letters Patent.   Patented Aug. 14, 1917.

Application filed April 28, 1914. Serial No. 835,048.

*To all whom it may concern:*

Be it known that I, WILLIAM I. PATTERSON, a citizen of the United States, residing at Pittsburgh, in the county of Allegheny and State of Pennsylvania, have invented a new and useful Improvement in Outlet-Boxes for Electric Conductors, of which improvement the following is a specification.

My invention relates to improvements in outlet boxes for electric conduits and receptacle supports.

The object of my invention is to produce a structure comprising a box of this type, the cover of which is capable of adjustment with relation to the plane of the floor independently of the box, and regardless of whether or not the box is in horizontal alinement with the floor; a recepatcle support contained in said box capable of adjustment with relation to the top or cover and the plane of the floor independently of the cover carrying adjusting ring. In carrying out my invention, I produce a structure, the cover portion of which, and the receptacle support contained or located in the box are capable of, not only vertical but also of lateral or horizontal and angular adjustment to the plane of the floor. I accomplish these objects and at the same time produce a simple, cheap and efficient structure of this type by means of the device hereinafter more specifically described, reference being had to the accompanying drawings forming part hereof in which:

Figure 1 is a plan view of my improved device, the top plate and gasket being removed.

Fig. 2 is a central sectional elevation of the same.

Fig. 3 is a detail view of a portion of the ring and one of the arms of the yoke.

Fig. 4 is a plan view of a fragmentary portion of the adjusting ring at line 1—1 of Fig. 1.

Fig. 5 is an elevation of the same.

Fig. 6 is a plan view of the receptacle support or yoke.

Fig. 7 is a plan view of a fragmentary portion of the adjusting ring at line 2—2 of Fig. 1.

Fig. 8 is a section of a fragmentary portion of the cover carrying adjusting ring on lines 2—2, Fig. 1.

Referring to said drawings;—1 is a box constructed of any suitable material and of any usual shape and is provided with threaded openings 2 in the side walls thereof for the attachment of conduits, and with orifices *a* for screws to enable the box to be secured below the plane of the floor. The upper portion or rim of said box is provided with a comparatively deep groove 3 to contain a plastic substance 4 for the purpose hereinafter specified. 5 is a ring or annulus the lower portion of which is adapted to be seated in said groove, as hereinafter specified, for the purpose hereinafter specified. The upper portion of said ring is provided with an inwardly projecting annular shelf, ledge or flange 6, the juncture of which with the wall of the ring forms a recess 7 in which is seated a plate 8, the said plate having a centrally disposed opening 9, and preferably semi-circular recesses or notches 10 in the peripheral edge thereof corresponding with screw orifices 11 in the flange of the adjusting ring. At the place where the screw orifices 11 are found in the flange of the ring a raised portion 24 corresponding in shape with the semi-circular recesses 10 in the edge of plate 8 is formed as a guide to enable the ready placement of said plate. The annular flange 6 of said adjusting ring is provided with diametrically disposed recesses 12 formed by the inwardly projecting guide lugs 13, the inner edges of which, with the inner edge of the flange, constitute the walls of said recesses. 14 is a rubber gasket adapted to be secured upon the top of plate 8. 15 is the top plate of the structure which is provided with screw receiving orifices in alinement with the orifices 11 in the flange of the adjusting ring so that said plate 15, gasket 14 and plate 8 may be secured to said adjusting ring by the same screws 15ª. The said plate 15 is provided with a centrally disposed threaded orifice 16 for the reception of the nozzle 17. 18 is a yoke or U-shaped receptacle support provided at the upper ends of its arms with laterally projecting horizontal portions 19, to which the receptacle 20 is secured by screws 21. The bottom of said yoke or U-shaped receptacle support rests loosely upon and is supported by the adjustable stud or thimble 22 which is operably mounted upon the screw 23 secured in the bottom of the box, the operation of the thimble on the screw elevates and lowers the receptacle carried by the yoke which is capable of being tilted sidewise on said thimble to obtain angular adjustment in the event the box is not in horizontal alinement with the floor as shown in Fig. 2. The horizontal members 19 of said yoke project within the diametrically disposed recesses 12, and, when the plate 8 is secured in place, the said yoke and receptacle are held securely in any position to which they may be adjusted, as shown in Fig. 2.

From the foregoing description it will be seen that the receptacle supporting yoke 18 is not secured to the cover or supported thereby, but that the base thereof rests loosely upon the adjustable stud 22 so that it can be tilted laterally and moved up and down independently of the box. This adjustment is also made independently of the cover, since the receptacle can thus be adjusted before the cover is applied to the box.

The groove formed in the upper portion or rim of the box is adapted to receive a plastic substance capable of hardening or setting in a manner similar to plaster of Paris. The said substance when hardened around the embedded portion of the ring, after the same has been adjusted in any desirable position, forms a water-tight joint at such point and maintains said ring and connected members in any adjusted position, the ring being capable of vertical, lateral and angular or tiltable adjustment to conform to the floor level regardless of whether the box is in horizontal alinement with the floor or not. The yoke or receptacle support is also capable of corresponding adjustment independent of the ring.

Having described my invention, what I claim and desire to secure by Letters Patent is:

1. A floor outlet for electric conductors, including a box, a removable cover constructed and mounted to be adjusted to the plane of the floor independently of the box, a screw projecting from the bottom of the box, a thimble adjustably threaded upon the screw, and a receptacle support removably inserted within the box and resting loosely upon the thimble so that it can be rocked thereon in all directions and tilted to any desired angle before the cover is applied.

2. A floor outlet for electric conductors, including a box, a cover constructed and mounted to be adjusted to the plane of the floor independently of the box, a single stud projecting from the bottom of the box, a U-shaped receptacle support having the lower end thereof resting loosely upon the stud so that it can be rocked thereon in all directions and tilted to any desired angle before the cover is applied, and a receptacle secured within the U-shaped receptacle support.

3. A floor outlet for electric conductors, including a box, a ring arranged loosely within the mouth of the box so as to be adjusted to the plane of the floor independently of the box, a single stud projecting from the bottom of the box, a U-shaped receptacle support adapted to be inserted into the box through the ring and to rest loosely upon the stud so that it can be rocked thereon in all directions and tilted to any desired angle, a receptacle secured within the U-shaped support, and an independent cover plate detachably applied to the ring.

4. A floor outlet for electric conductors, including a box, a ring arranged loosely within the mouth of the box so as to tilt freely in all directions and be adjustable to the plane of the floor independently of the box, a screw projecting from the bottom of the box, a thimble adjustably threaded upon the screw, a U-shaped receptacle support insertible into the box through the ring and having the lower end thereof resting loosely upon the thimble so that it can be rocked thereon in all directions and tilted to any desired angle, a receptacle secured within the U-shaped support, and an independent cover detachably secured to the ring.

5. A floor outlet for electric conductors, including a box, a cover for the box adapted to be adjusted to the plane of the floor independently of the box, a single stud projecting from the bottom of the box, a receptacle support removably inserted within the box and resting loosely upon the stud so that it can be rocked thereon in all directions and tilted to any desired angle before the cover is applied.

6. A floor outlet for electric conductors, including a box, a ring adjustably applied to the mouth of the box, a cover detachably secured to the ring, a stud projecting from the bottom of the box, and a receptacle support adapted to be removably inserted into the box through the ring and resting loosely upon the before mentioned stud so that it can be tilted thereon to any desired angle, the ring serving to loosely engage the sides of the receptacle support to retain the same in an upright position.

In testimony whereof, I have hereunto signed my name in the presence of two subscribing witnesses.

WILLIAM I. PATTERSON.

In the presence of—
JOHN H. RONEY,
CLARENCE A. WILLIAMS.

Copies of this patent may be obtained for five cents each, by addressing the "Commissioner of Patents Washington, D. C."